(12) United States Patent
Stokes et al.

(10) Patent No.: US 10,115,072 B2
(45) Date of Patent: Oct. 30, 2018

(54) METHOD AND APPARATUS FOR SELECTIVE DEEP SCAN USING A MOTION SENSOR CO-LOCATED WITH RFID READER

(71) Applicant: Intel Corporation, Santa Clara, CA (US)

(72) Inventors: Dan Stokes, Encinitas, CA (US); John Belstner, Valley Center, CA (US); Adam Blair, Encinitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/443,526

(22) Filed: Feb. 27, 2017

(65) Prior Publication Data

US 2017/0249589 A1    Aug. 31, 2017

Related U.S. Application Data

(60) Provisional application No. 62/300,637, filed on Feb. 26, 2016, provisional application No. 62/369,488, filed on Aug. 1, 2016.

(51) Int. Cl.
*G06K 7/10* (2006.01)
*G06Q 10/08* (2012.01)
(Continued)

(52) U.S. Cl.
CPC ....... *G06Q 10/087* (2013.01); *G06K 7/10128* (2013.01); *G06K 7/10366* (2013.01); *G06K 19/0723* (2013.01); *G06Q 20/203* (2013.01)

(58) Field of Classification Search
CPC .......... G06K 7/10099; G06K 7/10108; G06K 7/10128; G06K 7/10148; G06K 7/10217;
(Continued)

(56) References Cited

U.S. PATENT DOCUMENTS 6,590,834 B1 * 7/2003 Highfill ................. G01C 15/00
367/128
8,321,303 B1    11/2012 Krishnamurthy et al.
(Continued)

OTHER PUBLICATIONS

International Searching Authority, "International Search Report & Written Opinion", issued in connection with International Patent Application No. PCT/US17/19769, dated Jul. 17, 2017 (19 pages).

*Primary Examiner* — Suezu Ellis
(74) *Attorney, Agent, or Firm* — Hanley, Flight & Zimmerman, LLC

(57) ABSTRACT

A radio frequency identification (RFID) reader is disclosed that allows for selective deep scans of RFID tags. The RFID reader may include a motion detection sensor, a radio frequency transceiver configured to transmit RF energy at first and second frequencies, and a processor. The processor may perform the following steps: (1) when motion is detected by the sensor, commanding the transceiver to transmit RF energy at the first RFID profile; and (2) when motion has not been detect for a predetermined time period, commanding the transceiver to transmit RF energy at the second RFID profile. A method for using the RFID reader to perform selective deep scanning is also disclosed.

14 Claims, 9 Drawing Sheets

(51) Int. Cl.
*G06Q 20/20* (2012.01)
*G06K 19/07* (2006.01)

(58) Field of Classification Search
CPC ........... G06K 7/10366; G06K 7/10405; G08B 13/1427; G08B 13/248; G08B 13/2488; G06Q 10/087; G06Q 20/203
See application file for complete search history.

(56) References Cited

U.S. PATENT DOCUMENTS

| | | | |
|---|---|---|---|
| 9,672,396 B1* | 6/2017 | Bookman | G06K 7/10366 |
| 2007/0046432 A1* | 3/2007 | Aiouaz | G06K 17/0022 |
| | | | 340/10.1 |
| 2007/0236352 A1 | 10/2007 | Allen, Jr. et al. | |
| 2009/0045955 A1* | 2/2009 | Ulrich | G06Q 20/208 |
| | | | 340/572.1 |
| 2009/0221301 A1* | 9/2009 | Riley | G08B 13/1427 |
| | | | 455/456.5 |
| 2010/0176926 A1* | 7/2010 | Jo | H04W 72/082 |
| | | | 340/10.2 |
| 2012/0313757 A1* | 12/2012 | Volpi | G06K 7/0008 |
| | | | 340/10.1 |
| 2014/0253293 A1 | 9/2014 | Sadr | |
| 2015/0269818 A1* | 9/2015 | Jain | G08B 13/248 |
| | | | 340/572.1 |

* cited by examiner $P_S=0.99$ $P_S=0.01$ $P_D$=0.8

$P_S$=0.1

$P_E=0.99$ $P_E=0.01$ $I_D$=0.6

$I_D$=0.1

METHOD AND APPARATUS FOR SELECTIVE DEEP SCAN USING A MOTION SENSOR CO-LOCATED WITH RFID READER

CLAIM OF PRIORITY

This application claims priority to U.S. provisional application No. 62/300,637, entitled "MOTION SENSOR CO-LOCATED WITH RFID READER/PROBABILISTIC INVENTORY APPLICATION FOR RFID READER", which was filed on Feb. 26, 2016, and U.S. provisional application No. 62/369,488, entitled "AUTONOMOUS ALGORITHMS TO CONTROL A NETWORK OR RFID READERS FOR OPTIMIZED ASSET TRACKING AND INVENTORY MANAGEMENT", which was filed on Aug. 1, 2016, the contents of both are incorporated herein by reference.

TECHNICAL FIELD

This invention relates to a radio frequency identification (RFID) systems. More particularly, the invention relates to a method to improve the performance of RFID systems and to more refine inventory prediction models for such systems.

BACKGROUND

Radio-frequency identification (RFID) is a ubiquitous technology that employs electromagnetic fields to automatically identify and track tags that contain electronically stored information. Passive RFID tags collect energy from a nearby RFID reader's interrogating radio-frequency (RF) signal to report the electronic data stored within the tag. The data may include a unique electronic product code (EPC) that can be associated with the characteristics of the object to which the tag is connected.

Because RFID tags use radio-frequency (RF) signals they need not be within the line of sight of the RFID reader, an advantage over optical barcode technology. RFID tags may thus be embedded in the tracked object or object packaging.

RFID tags are used throughout many industries, including retail, equipment manufacturing, and equipment rental facilities to name a few. For example, a manufacturing plant may embed an RFID tag on a component, and can track that component throughout the manufacturing process, and the distribution and sale process thereafter. Banks use RFID tags attached to cash to track the flow money, and such tags are incorporated into the uniform product code (UPC) labels on clothing. Ranchers may implant RFID tags into their animals to track the movement of their herds.

RFID may also be used as part of an inventory management system. A reader may send out an interrogation RF signal, then for each tag that reports back, the system can flag the associated item as remaining in inventory. Those tags that do not report back are flagged as not in inventory.

When several RFID tags are located within a confined volume, it can be difficult or impossible to interrogate them all. For example, a warehouse may have thousands of tagged items, some of which may be on the fringe of the RFID reading area, while others may be blocked from the interrogating RF signal, preventing their successful interrogation by the RFID reader. Conventional RFID inventory technology will incorrectly flag these non-interrogated tags (and their associated objects) as not in inventory. This false reporting leads to costly lost sales, over-ordering, and over-stocking, frustrating the purposes of RFID inventory management. Accordingly, improvements to existing RFID systems are needed to more accurately detect and report tagged inventory.

SUMMARY

The present invention(s) elegantly overcome many of the drawbacks of prior systems and provide numerous additional improvements and benefits as will be apparent to persons of skill in the art. Provided in various example embodiments is a probabilistic inventory application for an RFID system that provides a more accurate prediction of a facility's inventory. Additional structures, systems, and methods are also provided for improved deep scanning of RFID tags throughout a facility to improve the accuracy of inventory reporting.

Turning first to probabilistic inventory applications for RFID readers, provided in various example embodiments is a radio frequency identification (RFID) system for monitoring a space. Such systems may include one or more controllers each connected to one or more RFID readers, where each reader can detect data signals from a plurality of RFID tags attached with objects. The objects may be part of an object category. Example systems may also have a database connected to the controller, which may record, for example: (1) a time when the data signal is received from each tag in the plurality; and (2) the data contained in the data signal from each tag in the plurality. Example systems may include a processor that can perform an inventory analysis of the objects based on a confidence probability curve. For example, in one embodiment this curve may be a decaying function that is based on various probabilities.

In various example embodiments the system may also create a contra-EPC. For example, at least one of the plurality of RFID readers may comprise an exit RFID reader used in a point-of-sale (POS) system that records the sale of an object in a database. A processor may be connected to the POS system to perform the following steps, for example: (1) when sales information is received from the POS system, monitoring the exit RFID reader for detection of data signal from a RFID tag in the plurality, and if an RFID tag is so detected, matching the sales information to the RFID tag and updating the database; and (2) if an RFID tag is not so detected, creating a contra-EPC associated with the object and updating the database.

In various example embodiments the inventory analysis may include the steps of: (1) calculating an in-store probability for each RFID tag in the plurality based on the confidence probability curve and the time for each RFID tag; and (2) summing the in-store probabilities. When a contra-EPC is encountered, however, the system may calculate a probability for each contra-EPC based on the confidence probability curve where the contra-EPC probabilities are subtracted from the summation. In certain example embodiments where an exit RFID reader is used, the summation total may be configured to not include probabilities for RFID tags detected by the exit RFID reader.

In various example embodiments the confidence probability curve may be based on a variety of parameters, such as the following four parameters for example: (1) $P_S$—the probability of an RFID tag from the plurality being read in a day; (2) $P_D$—the probability of an RFID tag from the plurality that is unreadable becoming readable within a day; (3) $P_E$—the probability of an RFID tag from the plurality exiting the space monitored by the RFID system without being detected by the RFID system; and (4) $I_D$—the percentage of objects exiting the space monitored by the RFID system. As the system encounters and records more information these probabilities may be refined and changed. A specific confidence probability curve may be based on the following equation, for example, where D is the number of days elapsed since the data signal from the RFID tag was received by the RFID system:

$$\frac{(1-I_D)^D(1-P_S)(1-P_D)^D}{(1-I_D)^D(1-P_S)(1-P_D)^D + P_E(1-(1-I_D)^D)}$$

Various example methods of using confidence probability curves are disclosed herein.

Further provided in various example embodiments are motion sensors co-located with RFID readers. For example, a radio frequency identification (RFID) reader is disclosed that may contain a motion detection sensor, a radio frequency transceiver configured to transmit RF energy at a first and second RFID profile, and a processor. The processor may perform the following steps, for example: (1) when motion is detected by the sensor, commanding the transceiver to transmit RF energy at the first RFID profile; and (2) when motion has not been detect for a predetermined time period, commanding the transceiver to transmit RF energy at the second RFID profile. The motion sensor may be an optical, acoustic, infrared, sonar, or LIDAR sensor, for example. Such unique RFID readers may facilitate selective deep scans of RFID tags.

For example, such unique readers may be deployed as part of larger multi-reader systems connected with a central controller. In various example embodiments, each such RFID reader may independently and selectively enter into a deep scan of the RFID tags. The RFID readers may be merged with a point-of-sale (POS) system that records sales information. For example, the system may perform an inventory analysis of objects connected to the plurality of RFID tags based on the information detected by the RFID system, and optionally in conjunction with data from the POS system. Various example methods of employing such selective deep scanning are disclosed herein.

Additional aspects, alternatives and variations as would be apparent to persons of skill in the art are also disclosed herein and are specifically contemplated as included as part of the invention, including but not limited to all the embodiments shown or discussed in the '637 application. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. It will be understood that certain components and details may not appear in the Figure(s) to assist in more clearly describing example aspects of the invention.

DETAILED DESCRIPTION OF EXAMPLE EMBODIMENTS

Figure 1:
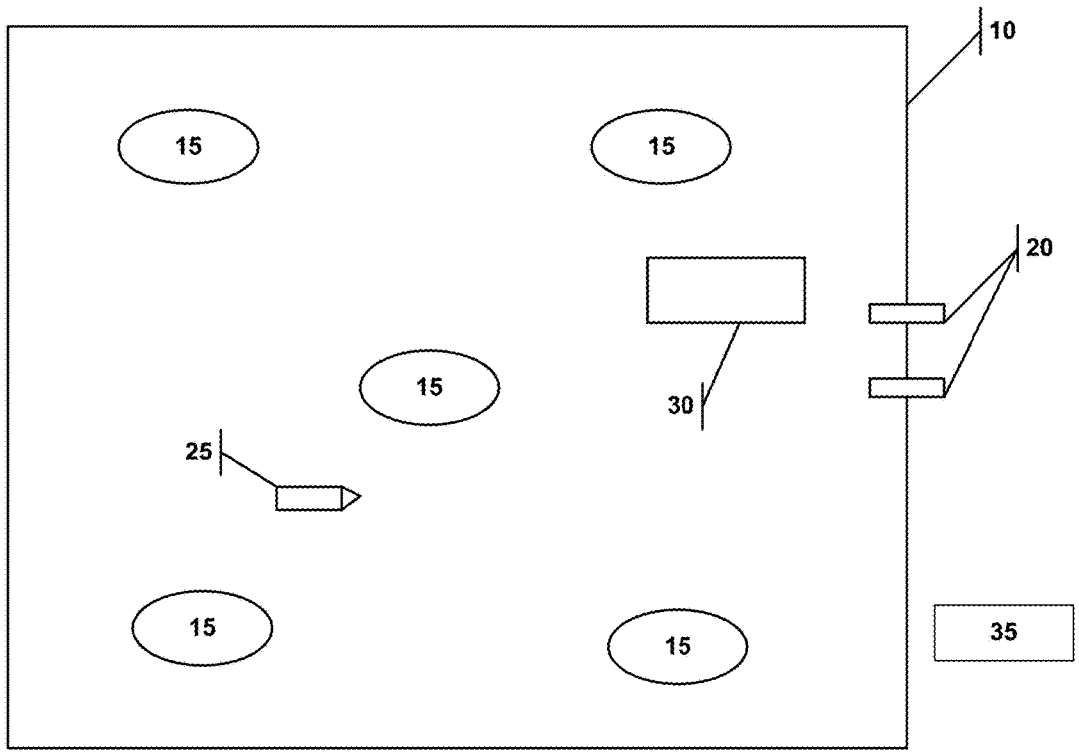
FIG. 1 illustrates a facility with a Responsive Retail Sensor (RRS) system and point-of-sale (POS) system for managing inventory.

Reference is made herein to some specific examples of the present invention, including any best modes contemplated by the inventor(s) for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of various aspects of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-10 and is provided for ease of reference, where like reference numerals designate corresponding features throughout the specification and figures:

Facility—10;
RFID Readers—15;
RFID Exit Readers—20;
RFID Tag—25;
Point-of-sale (POS) optical scanner/register—30;
Controller—35;
Method for creating a contra-electronic product code (EPC)—700-750;
Method for arriving at an inventory count for a particular uniform product code (UPC)—800-850;
RFID reader with motion sensor—900;
Processor—905;
Motion Sensor—910;
RFID Transceiver—915; and
Method for changing RFID profiles based on detected motion—1000-1035.

Described herein is a probabilistic inventory application for an RFID system that provides a more accurate prediction of a facility's inventory. Also described herein is an improved system and method for the deep scan of RFID tags throughout a facility, providing a more accurate inventory of the tagged items in the facility.

A. Probabilistic Inventory RFID Method and System

FIG. 1 illustrates a Responsive Retail Sensor (RRS) system that may be used within a facility 10. The RRS system may include a number of RFID readers 15 (also known as interrogators) placed throughout the facility 10. By non-limiting example, these readers 15 can be overhead and can also be handheld and mobile. A set of RFID exit readers 20 may be placed at an exit to the facility. Merchandise in the facility has physically connected with it a passive RFID tag 25. The facility may also have a point-of-sale (POS) system, for example at a check-out register, with an optical scanner 30 that may read optical codes attached with the merchandise. The RRS and POS systems may coordinate via a controller 35, which may manage the various components to either improve the ability of reading a tag or tags, or to avoid interference between the RFID readers, for example.

The readers 15, 20 can pulse a radio-frequency (RF) signal at the RFID tag 25. The RF signal powers the RFID tag 25 and causes it to transmit stored data, which the readers 15, 20 can detect and read. The data in this example embodiment is in the form of a unique electronic product code (EPC). An RRS system can thereby yield a database of RFID tag reads containing at least the following two pieces of information: (1) an EPC; and (2) when the EPC was last read.

An information table may be provided that associates each EPC to a particular product. For example, the EPC may be associated with a particular universal product code (UPC). UPCs are ubiquitous and are found on most consumer items. A UPC may be in the form of a bar code that an optical reader 30 may read. A UPC differs from an EPC in that a UPC is a category of product, while an EPC is a particular product. For example, the UPC associated with Levi's® Men's 501 Shrink To Fit Jeans is 052177361880. A particular store may have thirty pair of these jeans each with the same UPC, whereas those jeans would have thirty different EPCs unique to each pair.

When an RFID tag 25 is interrogated by a reader 15, 20, the tag 25 will ideally report its EPC, which is then read by the reader 15, 20. Then by cross reference to the UPC/EPC table, the inventory management system for the facility will know the status of that merchandise—i.e., it is still in the facility if it reported, or it presumably has left the facility if it did not report.

While it is desirable to have all RFID tags associated with every item readable at all times, this is often impractical. The physics involved with the wireless link between the reader and tag, combined with competing needs for positioning the tags or items a particular way, as well as the physical environment, often reduce the ability of the readers to read tags as regularly as would be desired. Problems exist when, for example, several RFID tags are present within the facility. Sending out an interrogation would likely result in several RFID tags reporting simultaneously. It is common for some of those tags to be lost in the noise and not detected. The location of the tag can also cause detection problems. For example, the tag may be at the bottom of a pile of other merchandise and the tag may not receive the interrogation signal. Or the tag may be under a metal shelf, forming a sort of Faraday cage that degrades the RF signal.

For any or all of the above reasons, a simple RRS system often misses several RFID tags and therefore cannot be relied on to form an accurate accounting of the inventory within a facility. And without an accurate accounting of the inventory, the facility would likely not run as efficiently as possible. A retail store, for example, would like to have a real-time accounting of its entire inventory so that it can order new merchandise as necessary. Additionally, knowing minute-by-minute inventory allows a retailer to predict trends for its merchandise and stock accordingly. A retailer can stock a larger variety of merchandise if it knows what sells when. Alternatively, the retailer may maintain a smaller inventory if it chooses to focus its merchandising efforts on only a few products. Ultimately, having an ongoing accurate picture of current inventory increases business efficiency, and simple RRS systems fails to meet this objective.

Rather than focusing on the ability of a system to read all items in the store, one example system and method disclosed herein uses data created by an RRS system and other data sources (e.g., point-of-sale (POS) data from optical systems at the register) to determine when items enter or exit the space. Using data regarding entry detection and data regarding exit detection, the system can statistically determine the likelihood of the item being in the facility. For example, the system can statistically determine the likelihood of the item being in the facility based on the last time it was read and whether it triggered an entrance or exit detection. Furthermore, the system can optionally learn the statistical trends of entrance and exit detections to improve the accuracy of the calculation of the likelihood the item is in the store.

Whereas traditional RRS systems provide a present or not-present flag for the tag, the present system and method can use existing RRS systems, along with the information from the POS system, to provide a predictive model of the current inventory of merchandise in a facility. This allows users to have more accurate cumulative metrics. For instance, if there are three items of the same type reported to be in a retail store, and it is calculated that each has a two-thirds likelihood of actually being in the store, the best guess is that there are two items actually in the store. A traditional approach would conclude that there are three items in the store. By allowing that retailer to make stock assessments based on the statistically more accurate estimate of two versus the less accurate literal measurement of three can increase efficiency in store operations. The merchandiser may also extrapolate product merchandising trends using data and statistical analysis from this system.

In various example embodiments the system may provide a confidence that a particular RFID tag (and thus the merchandise connected with it) is in the facility. The confidence is a probability (a value between 0.0 and 1.0) that an item is in the facility. The predicted total number of items in the facility is the sum of their probabilities.

Each time something happens that can confirm an item is actually present (i.e. read by RFID reader within the store) the probability for that EPC is set to 1.0. If an exit event is recorded (i.e., read by the exit RFID reader after a sale or consciously removed from inventory) then the probability for that EPC is set to 0. It is between these two extremes that the probabilistic methods described herein may be used. As time passes without another confirmation of the item within the store, the probability that it is still in the store decreases according to a confidence probability curve that may be unique to the facility. In various example embodiments the confidence probability curve may be based on at least the following five parameters:

$P_S$—Probability of item in store being read
  May be determined from the daily read percentage, and be updated continuously from day to day.
  Range 0-1
$P_D$—Probability of an unreadable tag becoming readable each day
  What % of the items in the store are picked up and moved, either by customers or store employees?
  Can be learned continuously from look-backs
  Range 0-1
$P_E$—Probability of exit error
  What is the % of missed "departed" events
  Can be learned from items that go unread for 30(TBR) days
  Range 0-1
$I_D$—Daily inventory turn percentage
  What % of the stores total items get sold each day?
  Can be learned by netting out exit events
    Total exit events+items unread for 30(TBR) days—return events
  Range 0-1
D—days since last read For each item, the following equation may be used to define the probability that the item is in inventory:

$$Pr[\text{in\_store}] = (1-I_D)^D \quad \text{(Eq. 1)}$$

$$Pr[\text{not\_read}] = (1-P_S)(1-P_D)^D \quad \text{(Eq. 2)}$$

$$Pr[\text{out\_of\_store}] = 1-(1-I_D)^D \quad \text{(Eq. 3)}$$

$$Pr[\text{left\_undetected}] = P_E \quad \text{(Eq. 4)}$$

A tag that has been unread for D days is either in the store and unread for D days (State A), or it left the store without triggering an exit event (State B). So the likelihood that it is in the store is A/(A+B), which is the confidence probability curve:

$$Pr[\text{in\_store} \mid \text{not\_read} \ \& \ \text{no\_exit\_event}] = \quad \text{(Eq. 5)}$$

$$\frac{(1-I_D)^D(1-P_S)(1-P_D)^D}{(1-I_D)^D(1-P_S)(1-P_D)^D + P_E(1-(1-I_D)^D)}$$

While this creates a robust confidence probability curve, a more elementary curve may be constructed with some by not all of the parameters discussed above. Testing demonstrates that use of these probabilities provides a system that is much more effective than the current present or not-present flag methodology.

Figure 2:
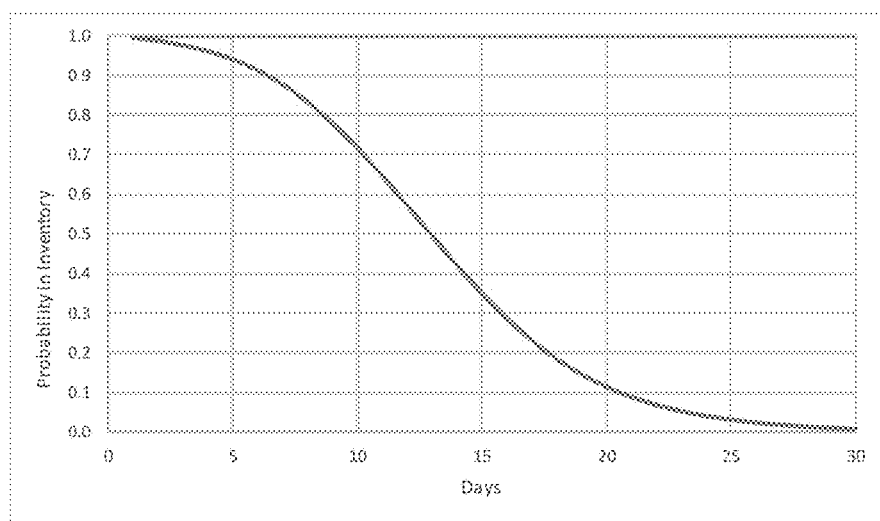
FIG. 2 illustrates a confidence probability curve with the parameters set to example default values.

The following example default values may be used to start the system: $P_S=0.75$; $P_D=0.2$; $P_E=0.1$; and $I_D=0.01$. Shown in FIG. 2 is a graphical representation of the confidence probability curve for a store with these default variables. Considering the following conditions for the parameters demonstrates and confirms the efficacy of Eq. 5.

Figure 3A:
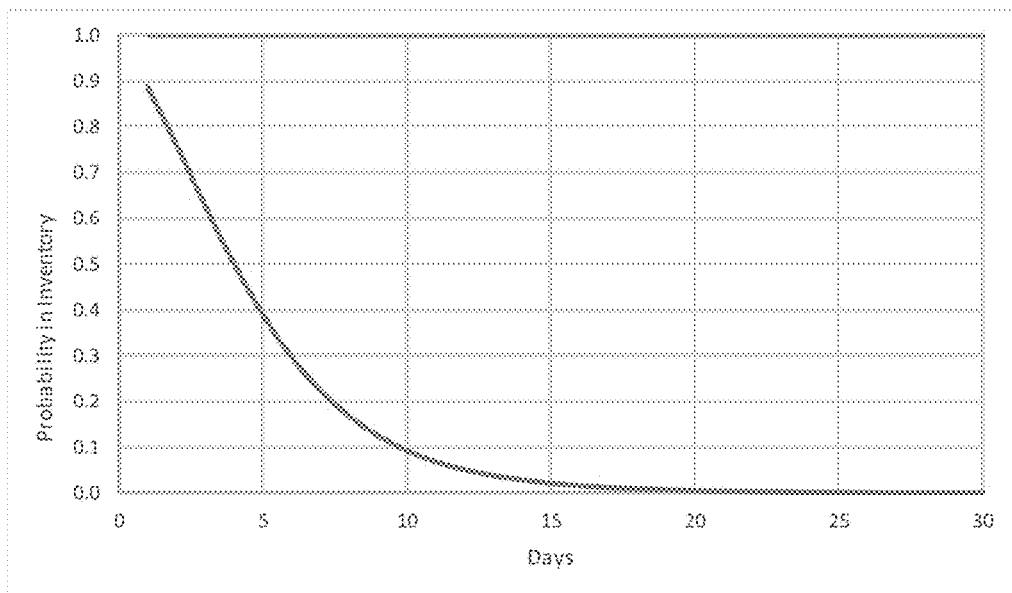
FIG. 3A illustrates a confidence probability curve with $P_S$ set at 0.99, and the other parameters set to the example default values of FIG. 2.
Figure 3B:
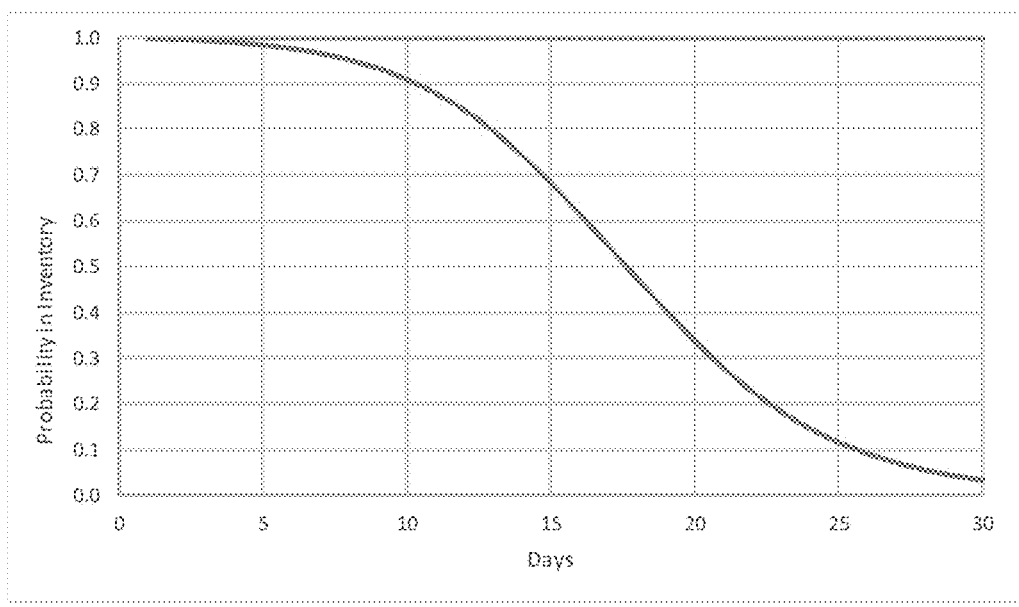
FIG. 3B illustrates a confidence probability curve with $P_S$ set at 0.01, and the other parameters set to the example default values of FIG. 2.

If the overhead RFID readers could read 100% of the store every day, one would expect the confidence to drop rapidly after not reading a tag for a couple days. If only 50% of the store's items are read by the overhead RFID readers each day, one would expect the confidence to not drop off nearly as fast. The effect on the confidence probability curve with the $P_S$ parameter changed from 0.99 to 0.01, with all other variable remaining constant at the default values is shown in FIGS. 3A and 3B.

Figure 4A:
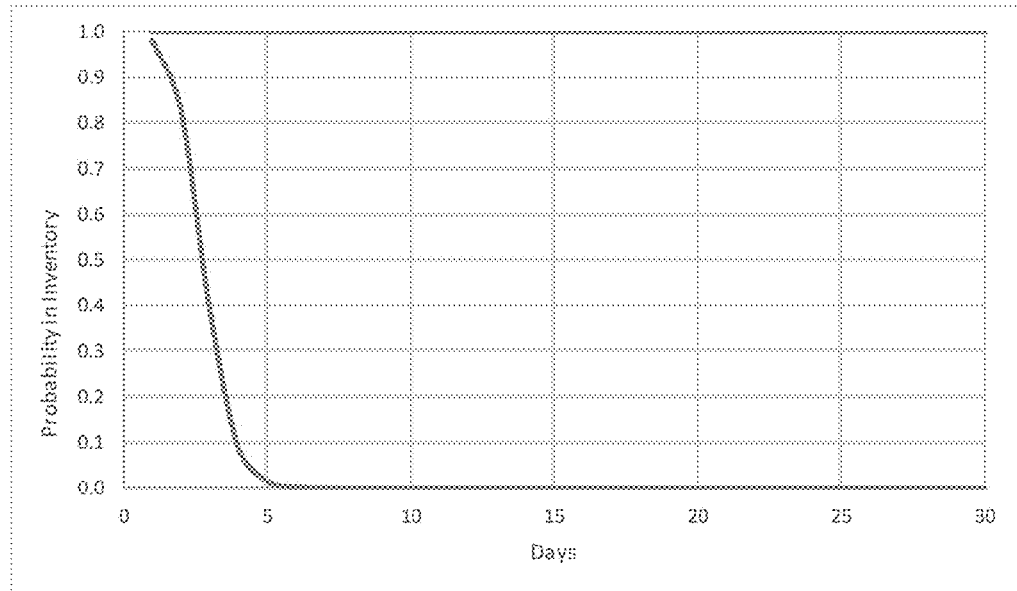
FIG. 4A illustrates a confidence probability curve with $P_D$ set at 0.8, and the other parameters set to the example default values of FIG. 2.
Figure 4B:
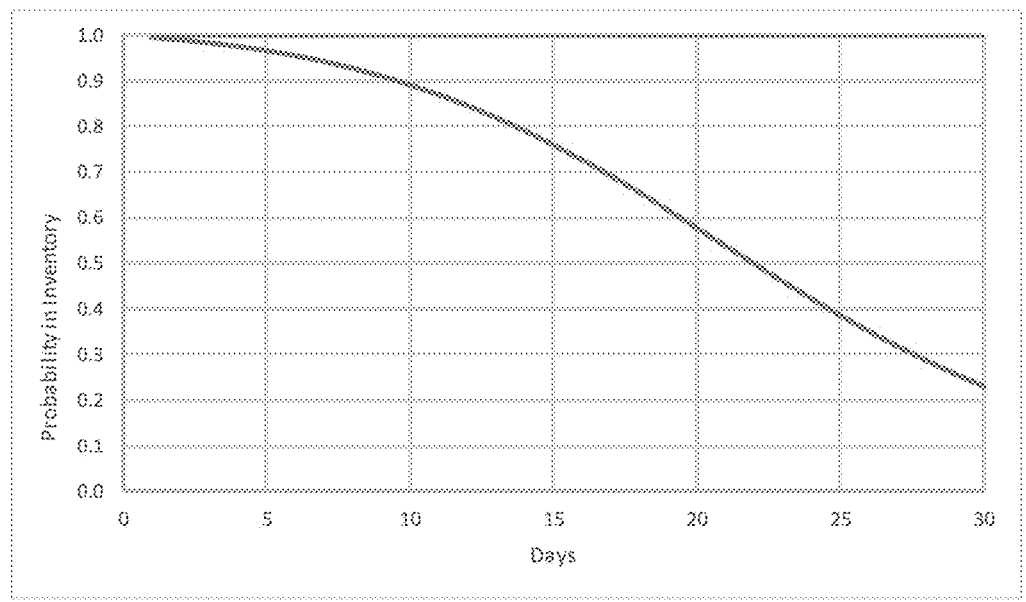
FIG. 4B illustrates a confidence probability curve with $P_D$ set at 0.01, and the other parameters set to the example default values of FIG. 2.

There are certain store activities that would make an otherwise unreadable tag readable again. The more of a store's items that are involved in one of these activities each day, the more readable those tags are. The confidence probability curve is affected in the same way as with the $P_S$ parameter. FIGS. 4A and 4B illustrate the effect on the confidence probability curve with the $P_D$ parameter changed from 0.8 to 0.1, with all other variable remaining constant at the default values. The following actions may increase the $P_D$ parameter: moving items from one display to the next; taking an item into the fitting room; retagging a known bad tag; and refolding and stacking merchandise (fluffing).

Figure 5A:
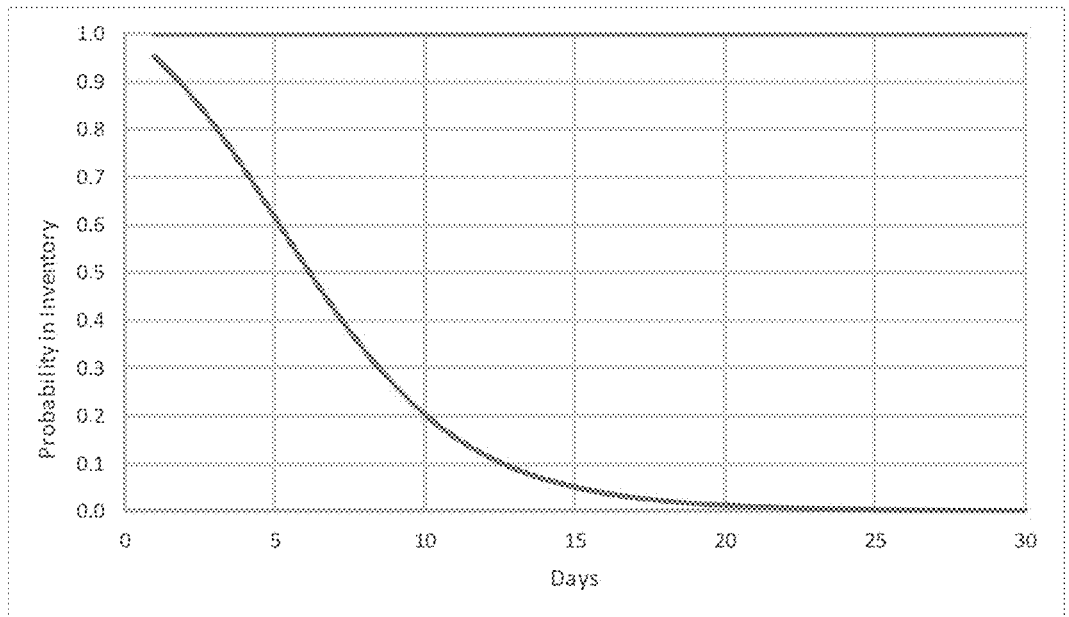
FIG. 5A illustrates a confidence probability curve with $P_E$ set at 0.99, and the other parameters set to the example default values of FIG. 2.
Figure 5B:
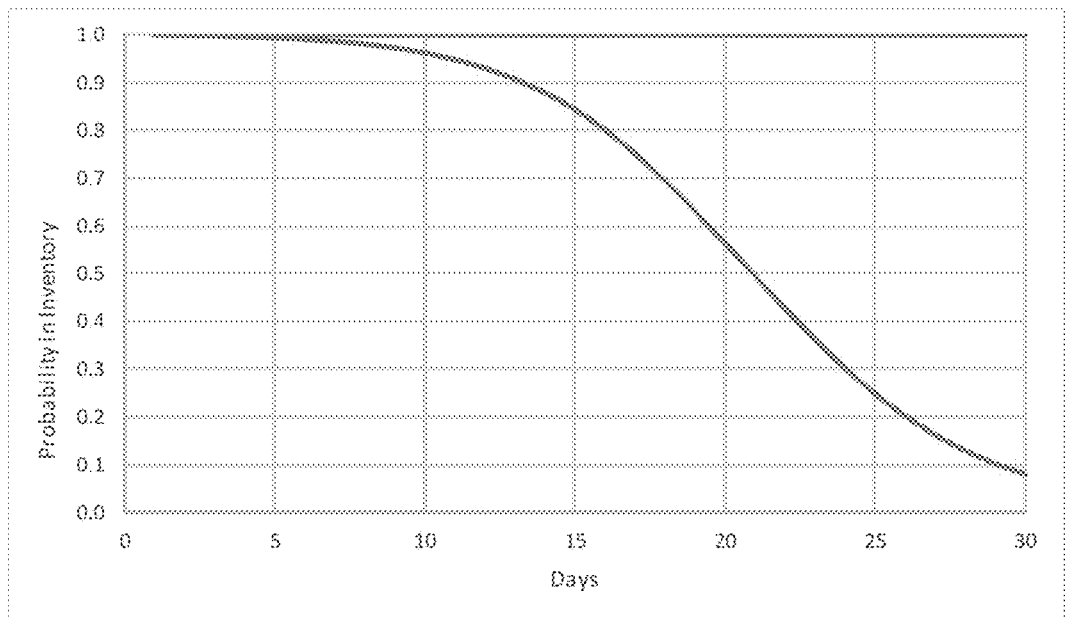
FIG. 5B illustrates a confidence probability curve with $P_E$ set at 0.01, and the other parameters set to the example default values of FIG. 2.

The number of missed departed events would have nearly the opposite effect. If there were never any missed departed events (i.e. 0%), then you would expect the confidence to remain high, even if you rarely read a tag. The effect on the confidence probability curve with the $P_E$ parameter changed from 0.99 to 0.01, with all other variable remaining constant at the default values is shown in FIGS. 5A and 5B.

Figure 6A:
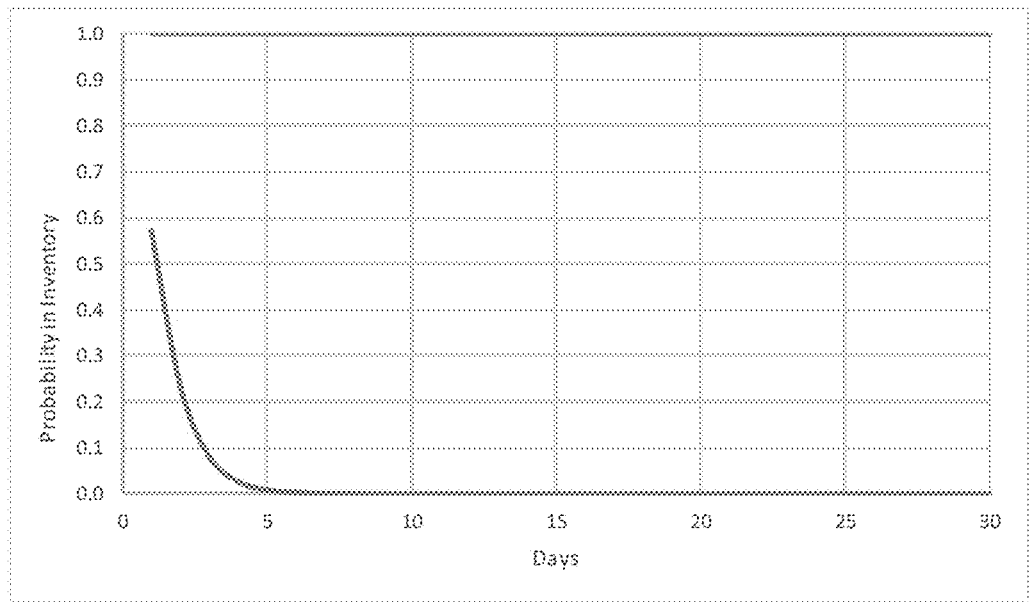
FIG. 6A illustrates a confidence probability curve with $I_D$ set at 0.6, and the other parameters set to the example default values of FIG. 2.
Figure 6B:
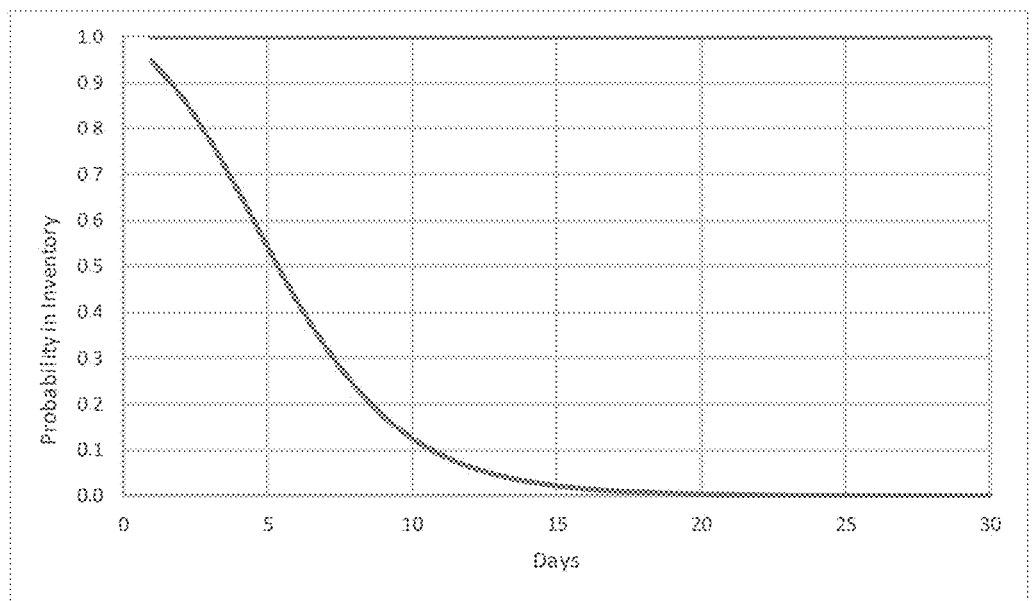
FIG. 6B illustrates a confidence probability curve with $I_D$ set at 0.1, and the other parameters set to the example default values of FIG. 2.

When the daily inventory turn is high, then the consequence of not reading a tag for a few days is also high. It is reasonable to assume that the tag has left the facility so one would expect the confidence to drop off more rapidly as time goes by. The effect on the confidence probability curve with the $I_D$ parameter changed from 0.6 to 0.1, with all other variable remaining constant at the default values is shown in FIGS. 6A and 6B.

To determine the inventory of a particular UPC, the system would pull the RRS records for the EPCs that are associated with the UPC. For example, a record for UPC 5656 could comprise the data shown in Table 1:

TABLE 1

| EPC | UPC | DAYS SINCE LAST READ FOR INSTORE RFID READER | DETECTED AT EXIT RFID READER OR DEPARTED |
|---|---|---|---|
| 00001 | 5656 | 1 | N |
| 00002 | 5656 | 11 | N |

TABLE 1-continued

| EPC | UPC | DAYS SINCE LAST READ FOR INSTORE RFID READER | DETECTED AT EXIT RFID READER OR DEPARTED |
|---|---|---|---|
| 00003 | 5656 | 29 | N |
| 00004 | 5656 | 2 | N |
| 00005 | 5656 | 3 | Y |

Using the confidence probability curve shown in FIG. 2, Table 2 lists the in-store probabilities for the EPC's listed in Table 1:

TABLE 2

| EPC | PROBABILITY IN STORE |
|---|---|
| 00001 | 1 |
| 00002 | .65 |
| 00003 | .01 |
| 00004 | .98 |
| 00005 | 0 |

Since EPC 0005 was detected at the exit RFID reader or departed (i.e., it was sold or otherwise removed from inventory) the value is set to 0 because it has left the store, regardless of the number of days it was scanned by the in-store RFID readers. Summing the in-store probabilities yields a value of 2.64. Thus, the number of items with the UPC code of 5656 in this example is predicted to be three. It is noteworthy that a prior art system would have reported an inventory of four because the RFID readers did read four EPCs with this associated UPC.

If instead of the default confidence probability curve, a facility had an extremely high probability of reading all of the tags each day (i.e., $P_S$ is 0.99) such that the facility confidence probability curve actually followed FIG. 3A, then the individual in-store probabilities would be as shown in Table 3:

TABLE 3

| EPC | PROBABILITY IN STORE |
|---|---|
| 00001 | 1 |
| 00002 | .0685 |
| 00003 | .0005 |
| 00004 | .98 |
| 00005 | .75 |

Summing the in-store probabilities yields a value of 1.819. Thus the number of items with the UPC code of 5656 in this example is predicted to be two. It is noteworthy that the confidence probability curve decays rapidly which is why the EPCs 00002 and 00003 with read days of 11 and 29 are severely discounted in the system and do not affect in any noticeably way the summed probability. This makes intuitive sense because the confidence probability curve is constructed with the assumption that 99% of the tags are read each day, so if the tags are not read more than a few days, then the system has confidence that the tag is no longer in the facility.

Because the POS system uses an optical bar code reader to read the UPC, the POS system alone cannot determine which of the unique EPCs has been sold at any particular time. By merging the data from the POS system and the RRS system, the facility can deduce which unique EPCs have actually been sold and are no longer part of the inventory. For example, the POS system may detect that an item with a UPC of 5656 was sold, and within a defined period the RRS system may detect an EPC with an associated UPC of 5656 at an exit RFID reader. The unified POS/RRS system can then deduce that the detected EPC was linked to the sold UPC, and the table for the unified POS/RRS system can be updated. The time between the POS scan and the RRS detection can vary. For example, the time may be a few minutes at an establishment where the registers are near the exit, such that a purchaser would not normally loiter in the store after consummating a purchase. Or it may be longer at an establishment that has several registers that are not located near the store exits, such that a user may purchase an item at one store register and then travel to a different department within the same store to purchase another item. The time period may be set to have the highest confidence that a large percentage of customer would have exited the store thus encountering the exit RFID reader, while simultaneously short enough to provide up-to-date calculation of the current inventory.

When an item is not detected at the store exit within the defined period of time, the unified POS/RRS system may assume that the item has indeed left the store. However, that assumption would decay over a period of days; i.e., the inverse of the confidence probability curve. The POS/RRS system may therefore assign a contra-EPC to the particular UPC that was detected as sold by the POS but not detected as exiting the store by the RRS.

The contra-EPC is simply another probability that must be summed to arrive at a final probability that represents the number of a particular UPC that remains in inventory. The difference, however, is that the contra-EPC has a negative probability. So taking the same example provided above with reference to tables 1 and 2, a UPC without a corresponding EPC could comprise the data shown in Tables 4 and 5, with the last entry being a contra-EPC:

TABLE 4

| EPC | UPC | DAYS SINCE LAST READ FOR INSTORE RFID READER | DETECTED AT EXIT RFID READER OR DEPARTED |
|---|---|---|---|
| 00001 | 5656 | 1 | N |
| 00002 | 5656 | 11 | N |
| 00003 | 5656 | 29 | N |
| 00004 | 5656 | 2 | N |
| 00005 | 5656 | 3 | Y |
| *** | 5656 | 2 | N |

TABLE 5

| EPC | PROBABILITY IN STORE |
|---|---|
| 00001 | 1 |
| 00002 | .65 |
| 00003 | .01 |
| 00004 | .98 |
| 00005 | 0 |
| *** | -.98 |

The contra-EPC indicates that an item was scanned at the POS two days ago, but not detected by the RRS exit RFID sensor. This results in a summed probability of 1.66, so two items with this UPC are predicted to be in inventory. As time passes the contra-EPC will have less and less effect on the overall probability.

In alternative embodiments the POS system does not use an optical scanner and instead scans the RFID tags to determine what has been sold at the register. If the POS system employs an RFID reader, then it would effectively be similar to the exit RFID reader and once the EPC is read (and cross-referenced to the UPC and the sales price) that EPC can be marked as sold and the tag database updated. In this scenario, it would not be necessary to have a time interval from the POS reading to the exit RFID detection because there would be no need to associate an UPC with an EPC, and therefore a contra-EPC would not be necessary.

Figure 7:
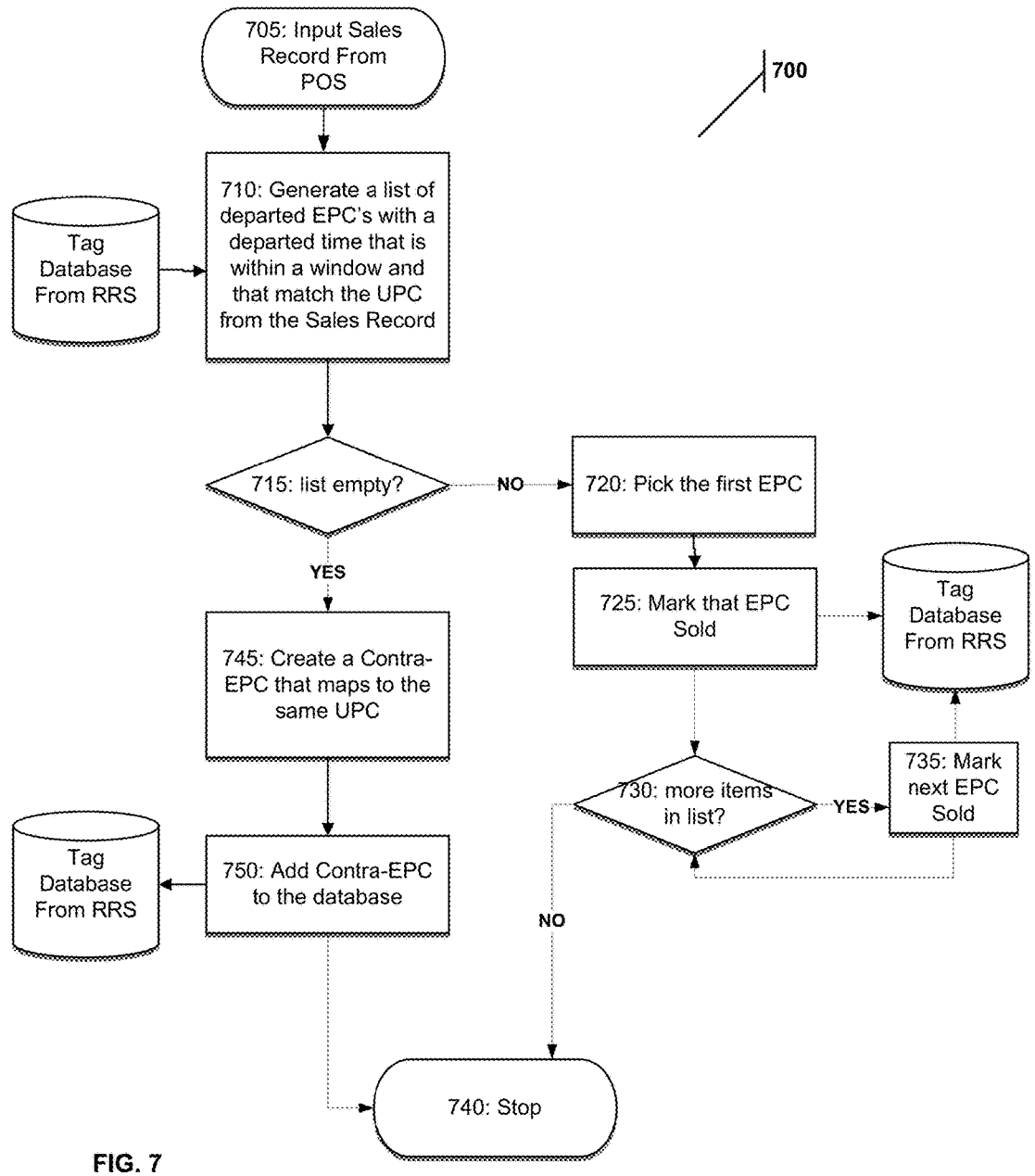
FIG. 7 is a flow chart depicting example steps that may be used to create a contra-electronic product code (EPC).

Shown in FIG. 7 is a flow chart depicting a method 700 for creating a contra-EPC. At step 705 the sales record from the POS is queried and a list of departed EPCs with the allotted time is also queried from the RRS system. That information is distilled into a list, attempting to match a UPC to the EPCs at step 710. If the list is not empty at step 715, then the first in the list of EPCs is marked as sold in steps 720 and 725, and the tag database for the RRS is updated. If there are further entries on the list, then the system may mark those EPCs as sold and update the tag database at steps 730 and 735. This may occur, for example, when a customer purchases multiple identical items, thus there would be a POS record evidencing multiple sales of a particular UPC and also multiple EPCs that have the same UPC associated with them. If however, the list is empty at step 715, the system then creates a contra-EPC that is associated with the same UPC at step 745, and the tag database is updated with the contra-EPC (step 750). This method is repeated for each UPC in the sales record. The method 700 is intended to discover and account for a mismatch between the POS system recording a sale of a particular UPC and the RRS system detecting an EPC with the particular UPC.

Figure 8:
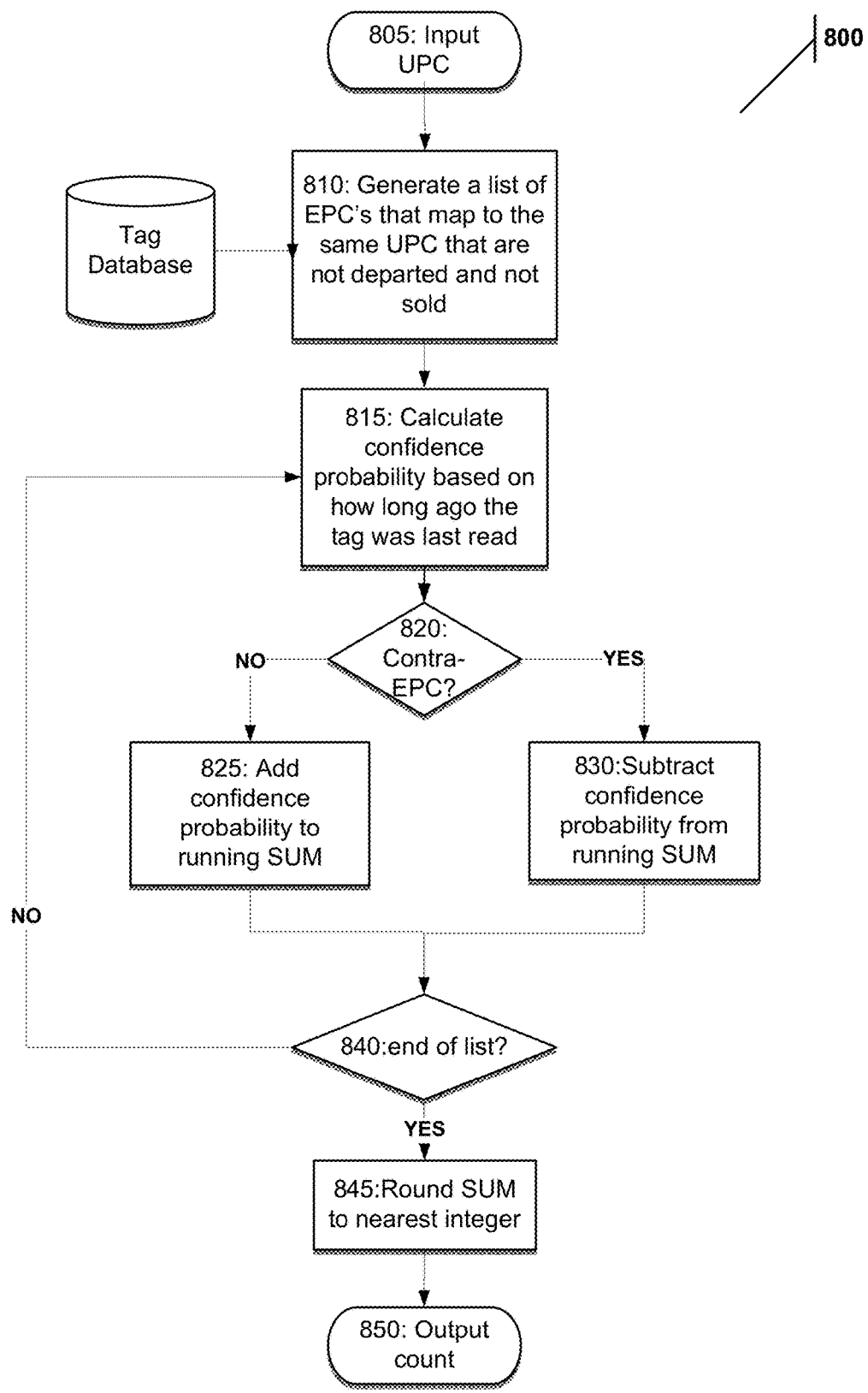
FIG. 8 is a flow chart depicting example steps that may be used to arrive at an inventory count for a particular uniform product code (UPC).

Shown in FIG. 8 is a flow chart depicting a method 800 for arriving at an inventory count for a particular UPC. First a particular UPC is selected at step 805, and the tag database is queried to generate a list of EPCs that are associated with the same UPC (step 810). For each item in the list, the confidence probability curve is consulted to calculate a probability based on the length of time from the last RFID reading (step 815). If the item in the list is a contra-EPC then the calculated confidence probability is subtracted from the running summation (step 830). If it is not a contra-EPC then the calculated confidence probability is added to the summation (step 825). This is performed for every item in the list (step 840), and the final summation is rounded to the nearest integer and outputted (steps 845 and 850).

The parameters used in the confidence probability curve can be refined by using past events. For example, $P_S$ (the probability of item in store being read in a day) may begin at 0.75 but over several days the system may determine that more than 75% of the known inventory has a last read date of a single day. In this case, the $P_S$ should be increased to more accurately match the data found in the system's database. Likewise $P_D$ (the probability of an unreadable tag becoming readable each day) can be refined by looking at the last read dates for blocks of EPCs. If, for example, a representative block of EPCs remains unreadable for a maximum of five days but on average the EPCs in the block are read every three days, then the default of 0.2 should be increased. Finally, if the system is creating several contra-EPCs at a rate of more than the currently set $P_E$ (the probability of exit error), then the $P_E$ should be increased. Making these refinements increases the accuracy of the system.

Utilizing the disclosed method and system has the added benefit of potentially identifying deficiencies in the existing RRS system. For example, a high contra-EPC count may indicate that the exit RFID sensors are misaligned or misconfigured, or the tags have other issues that place them out of range. Correcting this issue would tend to reduce the $P_E$. As a matter of practice, facilities often perform a hand RFID count and or a physical hand count. A high and continued discrepancy between the hand RFID or physical hand count and the inventory count may indicate that the overhead RFID readers are misaligned or misconfigured, or that the existing number of RFID readers is unable to cover the entire facility, resulting in "hidden" merchandise. Correcting this issue would tend to increase the $P_S$ and $P_D$.

By refining the parameters used in the confidence probability curve and correcting any deficiencies in the existing RRS system, the system can provide ever more accurate predictions of the current inventory within the facility. Not only does this assist in more efficient merchandising as discussed herein, it also can significantly reduce the need for periodic RFID scanning by hand.

B. Method and Apparatus for Selective Deep Scan Using A Motion Sensor Co-Located with RFID Reader RRS system may use an RFID tag that has different response times based on the RF signal that is interrogating it. This type of RRS system allows for a deep scan of the inventory, yielding more accurate readings.

Consider for example a stack of clothing that is being interrogated by RFID. The topmost item will likely be the most detectable to a ceiling mounted RFID reader, while the bottommost item may not be heard over the noise of all the items above it. In a deep scan, the RFID reader sends a continuous signal at a particular RFID profile for a period of time (e.g., for ten minutes) that attempts to elicit responses from all tags corresponding to that signal. But the tags are designed to go silent for a period of time after each sends their response (for instance for a period of one minute). Thus, the topmost items might report first and then go quiet (e.g., for a minute), allowing other items, such as the bottommost items, to be interrogated and detected by the readers. While the above discussion is simplified, in general this process is known as a deep scan.

Most facilities will perform a deep scan when the facility is closed because the inventory is not moving, such that the long response time will not adversely affect the readings with missed tags. But when the facility is operational, and items are moving, the RFID readers will change to an RFID profile that elicits a response from the tags at a much higher rate (e.g. 1 second, 0.5 seconds). When items are moving they are easier to detect. Nevertheless, at this higher rate the topmost tags may drown out the reporting signal from the bottommost tags. This is an example of a mobility scan.

In general, an effective mobility scan profile will allow any one particular tag to be read as often as possible. Reading a tag more frequently facilitates better tracking of the tag as it moves throughout the store. Some of the parameters that can be adjusted to support this are:

1. A modulation that supports a higher data transfer rate. In general, this is less robust. However, an RFID tag in motion is easier to read. Also, more frequent reads means that some of them can be dropped due to errors without adversely affecting the data collection process.
2. Using a session with a short persistence value. Querying the state of a session flag that has a short (or no) persistence value will that cause the tag to respond more frequently than querying the state of a session flag that has a long persistence value.
3. Using as small of a "Q" value as possible. Tags respond to the interrogator in a time-slotted fashion. The more time slots there are in a time epoch, the longer the period of time between opportunities for a tag to respond. The use of dynamic "Q" automatically chooses the smallest "Q" value possible.

4. Toggle the state of the session flag after each interrogation round. This allows all tags to participate in every interrogation round.

In general, an effective deep scan profile will read each tag capable of hearing the interrogator to respond only once. Suppressing multiple responses from a single tag facilitates a deeper read by allowing those tags with weaker responses to be heard by the interrogator. Some of the parameters that can be adjusted to support this are:

1. A modulation that supports a slower data transfer rate. In general, this is more robust. Since each tag is not read very often, it is important for that data transfer to be as robust as possible.
2. Using a session with a long persistence value. Querying the state of a session flag that has a long persistence value will cause the tag to respond once and suppress further responses.
3. Using as large of a "Q" value as possible. Tags respond to the interrogator in a time-slotted fashion. The more time slots there are in a time epoch, the fewer collisions there are between tags and the higher likelihood of the interrogator receiving the response. The use of fixed "Q" assures the "Q" value does not change.
4. Do not toggle the state of the session flag after each interrogation round. Once a tag responds to its interrogator, it will remains silent for as long as a tag is energized with RF (i.e. the end of the interrogation round). This allows all possible tags to respond at least once during interrogation round.

A sample value matrix for a mobility scan profile and a deep scan profile is provided in the Appendix.

Figure 9:
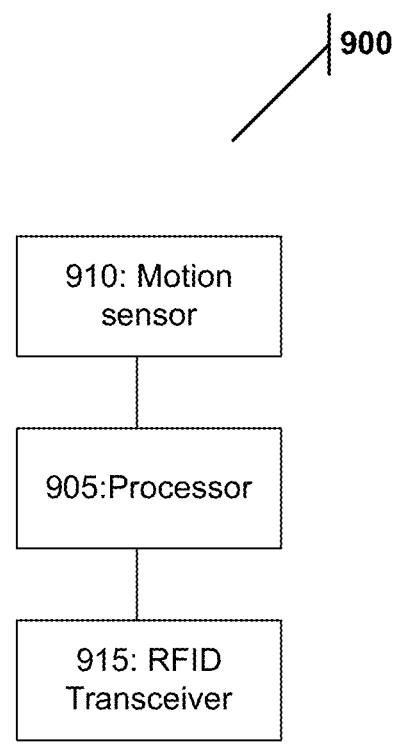
FIG. 9 illustrates an example RFID reader with an example motion sensor.

FIG. 9 depicts an RFID reader 900 with a processor 905 connected to a motion sensor 910 and the RFID transceiver 915. When the motion sensor 910 detects movement it reports this to the processor 905, which then sends instruction to the RFID transceiver 915 to emit RF energy to the tags at an RFID profile that will elicit responses from the tags at the higher rate (i.e., the mobility scan mode). Conversely, when no movement is detected, the processor 905 directs the RFID transceiver to emit RF energy to the tags at an RFID profile that will elicit responses from the tags at the lower but more robust rate (i.e., the deep scan mode). The system may use a predefined period between detected movement and no movement before activating the deep scan mode. If the facility has multiple RFID readers, some may be in deep scan mode while others are in non-deep scan mode, depending on the movement detected by the particular RFID reader. The motion sensor may be, for example, an optical, an acoustic, an infrared, a sonar, or a LIDAR sensor, or any other suitable type of sensor.

Figure 10:
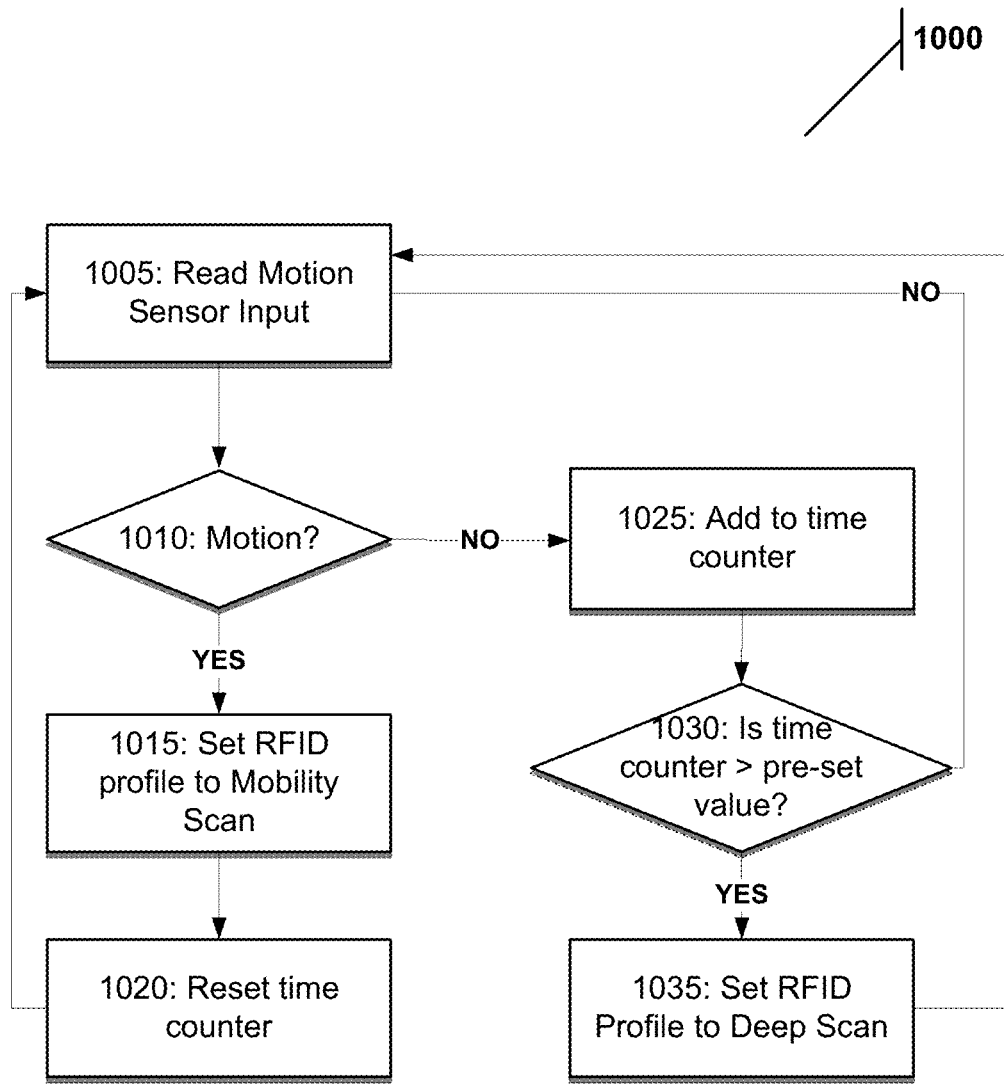
FIG. 10 is a flow chart depicting the examples steps that may be used to operate the RFID reader with a motion sensor of FIG. 9.

FIG. 10 is a flow chart depicting a method 1000 for method for changing RFID profiles based on detected motion. First at step 1005 the motion sensor data is collected and then assessed at step 1010. If motion is detected the RFID profile is set to mobility scan (step 1015) and the time counter is reset. The system then returns to collecting and assessing the motion sensor data. If however, no motion is detected then the time counter is increased at step 1025. If no motion has been detected for a long enough period (i.e., the time counter exceeds a predetermined threshold, step 1030) then the RFID profile is set to deep scan at step 1035.

The motion detecting RFID readers may be part of larger RRS and POS systems, for instance like those described herein. Permitting deep scanning during operational hours of the facility conveniently provides an overall more accurate reading of the RFID tags within the facility. This yields a more accurate probabilistic inventory model because more of the RFID tags are engaged by the process.

The above description of the disclosed example embodiments is provided to enable persons skilled in the art to make and use the invention. Various modifications to these example embodiments will be readily apparent to those skilled in the art, and the generic principles described herein can be applied to other example embodiments without departing from the spirit or scope of the invention. Thus, it is to be understood that the description and drawings presented herein represent a presently preferred example embodiment of the invention and are therefore representative of the subject matter which is broadly contemplated by the present invention. It is further understood that the scope of the present invention fully encompasses other example embodiments that may become apparent to those skilled in the art. The scope of the present invention is accordingly limited by nothing other than the appended claims.

APPENDIX

The foregoing disclosure may use various RFID profiles. The following is the value matrix for a Mobility and Deep Scan Profiles:

| | MOBILITY PROFILE | DEEP SCAN PROFILE |
|---|---|---|
| LINK_PROFILE | 2 or 3 | 0 or 1 |
| SESSION_FLAG | S0 or S1 | S2 or S3 |
| TARGET_STATE | Any | Any |
| Q_ALGORITHM | Dynamic | Fixed |
| FIXED_Q_VALUE | N/A | 12 |
| START_Q_VALUE | 4 | N/A |
| MIN_Q_VALUE | 4 | N/A |
| MAX_Q_VALUE | 15 | N/A |
| TOGGLE_TARGET_FLAG | true | false |
| REPEAT_UNTIL_NO_TAGS | false | true |

The values are defined as follows:

LINK_PROFILE specifies the RF physical layer parameters used for the next tag protocol operation. In general, the higher the Rate, the less robust. Definitions for the valid profiles are shown in the following chart:

| Link Profile | 0 | 1 | 2 | 3 |
|---|---|---|---|---|
| Modulation | DSB-ASK | PR-ASK | PR-ASK | DSB-ASK |
| Tari (US) | 25 | 25 | 25 | 6.25 |
| Data | 1 | .05 | 0.5 | 0.5 |
| Width (US) | 12.5 | 12.5 | 12.5 | 3.13 |
| R-T Calc (US) | 75 | 62.5 | 62.5 | 15.63 |
| T-R Calc (US) | 200 | 85.33 | 71.11 | 20 |
| Divide Ratio | 8 | 21.33 | 21.33 | 8 |
| Encoding | FM0 | Miller-4 | Miller-4 | FM0 |
| Pilot Tone | 1 | 1 | 1 | 1 |
| Link F (kHz) | 40 | 250 | 300 | 400 |
| Rate (kbps) | 40 | 62.5 | 75 | 400 |

SESSION_FLAG specifies which inventory session flag is matched against the inventory state specified by TARGET_STATE. Valid values are: S0, S1, S2, S3

TARGET_STATE specifies the state of the inventory session flag specified by SESSION_FLAG, for tags that are to have the operation applied to them. Valid values are: A, B, Any The Q (Query) value used to specify the number of time slots that a tag can respond in. Slots=2Q−1. There are several Q values specified: FIXED_Q_VALUE, START_Q_VALUE (used with Dynamic Q Algorithm), MIN_Q_VALUE (used with Dynamic Q Algorithm), MAX_Q_VALUE (used with Dynamic Q Algorithm). Valid values are: 0-15

TOGGLE_TARGET_FLAG specifies whether or not, after performing the inventory cycle for the specified target (i.e. A or B), the target should be toggled (i.e. A to B or B to A) and another inventory cycle should be run. Valid values are: false, true REPEAT_UNTIL_NO_TAGS specifies whether or not the singulation algorithm should continue performing inventory rounds until no tags are singulated. Valid values are: false, true For further disclosure regarding these values, the reader may reference the *EPC™ Radio-Frequency Identity Protocols Generation*-2 *UHF RFID; Specification for RFID Air Interface; Protocol for Communications at* 860 *MHz*-960 *MHz; Version* 2.0.0 *Ratified*, which is incorporated herein by reference. As of the date of the filing of this application, this reference could be downloaded from http://www.gs1.org/sites/default/files/docs/epc/uhfc1g2_2_0_0_standard_20131101.pdf.

The invention claimed is:

1. A radio frequency identification (RFID) reader comprising:
   a motion detection sensor;
   a radio frequency (RF) transceiver to transmit RF energy at a first and a second RFID profile; and
   a processor connected to the motion detection sensor and the RF transceiver, the processor to:
      when the motion detection sensor detects motion, instruct the transceiver to transmit the RF energy at the first RFID profile corresponding to a dynamic number of time slots in which an RFID tag can respond; and
      when the motion detection sensor has not detected motion for a predetermined time period, instruct the transceiver to transmit the RF energy at the second RFID profile corresponding to a fixed number of time slots in which the RFID tag can respond.

2. The RFID reader of claim 1, wherein the motion detection sensor includes at least one of an optical sensor, an acoustic sensor, an infrared sensor, a sonar sensor, or a LIDAR sensor.

3. The RFID reader of claim 1, wherein the second RFID profile is to cause a deep scan of a plurality of RFID tags.

4. A radio frequency identification (RFID) system comprising:
   a controller connected to a plurality of RFID readers, respective RFID readers including:
   a motion detection sensor;
   a radio frequency (RF) transceiver to transmit RF energy at a first and a second RFID profile; and
   a processor connected to the motion detection sensor and the RF transceiver, the processor to:
      when the motion detection sensor detects motion, instruct the transceiver to transmit the RF energy at the first RFID profile corresponding to a dynamic number of time slots in which an RFID tag can respond; and
      when the motion detection sensor has not detected motion for a predetermined time period, instruct the transceiver to transmit the RF energy at the second RFID profile corresponding to a fixed number of time slots in which the RFID tag can respond.

5. The system of claim 4, wherein the motion detection sensor includes at least one of an optical sensor, an acoustic sensor, an infrared sensor, a sonar sensor, or a LIDAR sensor.

6. The system of claim 4 further including a plurality of RFID tags, respective ones of the RFID tags to transmit data at a first time interval when the respective tag receives the RF energy at the first RFID profile, and at a second time interval when the respective tag receives the RF energy at the second RFID profile.

7. The system of claim 6, wherein the plurality of RFID tags are to transmit data for the second time interval for a longer duration than the first interval.

8. The system of claim 4, wherein the RF transceiver in the respective readers is to detect data signals from a plurality of RFID tags, the system further including a database operatively connected with the controller, the database to record a time when the data signals are received from respective tags in the plurality of RFID tags, data contained in the data signals from respective tags in the plurality of RFID tags.

9. The system of claim 8, wherein the data signals include an electronic product code (EPC).

10. The system of claim 8 wherein respective ones of the RFID tags are connected with an object, the system further including a point-sale-sale (POS) system that is to record sales information for the object in the database.

11. The system of claim 8, wherein the controller includes a second processor to perform an inventory analysis of objects connected to the plurality of RFID tags.

12. A method for selectively inducing a deep scan in a radio frequency identification (RFID) system monitoring a space, the system including a controller connected to a plurality of RFID readers, wherein respective RFID readers include a motion detection sensor, and a radio frequency (RF) transceiver to transmit RF energy at a first and a second RFID profile, the method comprising:
   when the motion detection sensor detects motion, instructing the transceiver to transmit the RF energy at the first RFID profile corresponding to a dynamic number of time slots in which an RFID tag can respond; and
   when the motion detection sensor has not detected motion for a predetermined time period, instructing the transceiver to transmit the RF energy at the second RFID profile corresponding to a fixed number of time slots in which the RFID tag can respond.

13. The method of claim 12, wherein the RF transceiver in respective readers is to detect data signals from a plurality of RFID tags, the method further including:
   recording a time when the data signal is received from respective tags in the plurality of RFID tags; and
   recording the data contained in the data signal from the respective tags in the plurality of RFID tags.

14. The method of claim 12, further including performing an inventory analysis of objects connected with the plurality of RFID tags.

* * * * *